United States Patent [19]
Hines

[11] Patent Number: 5,396,760
[45] Date of Patent: Mar. 14, 1995

[54] GAS-SIDE BYPASS FLOW SYSTEM FOR THE AIR RECUPERATOR OF A GAS TURBINE ENGINE

[75] Inventor: William R. Hines, Cincinnati, Ohio

[73] Assignee: General Electric Company, Cincinnati, Ohio

[21] Appl. No.: 145,116

[22] Filed: Nov. 3, 1993

[51] Int. Cl.⁶ .............................................. F02C 7/10
[52] U.S. Cl. .............................................. 60/39.511
[58] Field of Search ............... 60/39.511, 722, 39.75, 60/39.5, 39.512

[56] References Cited

U.S. PATENT DOCUMENTS

| | | | |
|---|---|---|---|
| 2,914,917 | 12/1959 | Van Nest | 60/59.511 |
| 3,222,864 | 12/1965 | Dyste et al. | 60/39.511 |
| 3,386,243 | 6/1968 | Beam, Jr. et al. | 60/39.511 |
| 5,274,997 | 1/1994 | Inoue et al. | 60/39.511 |

OTHER PUBLICATIONS

Batchelor, G. K., An Introduction to Fluid Dynamics, Cambridge Press, 1970, pp. 90, 91.
Wallis, R. A. Axial Flow Fans, Design and Practice, Clowes and Sons, Limited, London, 1961, pp. 390, 391.

Primary Examiner—Timothy S. Thorpe
Attorney, Agent, or Firm—Jerome C. Squillaro; David L. Narciso

[57] ABSTRACT

A bypass flow system for a gas-side air recuperator of a gas turbine engine. Pressurized air from the compressor section of the gas turbine is caused to pass through a pair of heat exchangers arranged in parallel spaced relationship and located in the hot gas stream between the exhaust gas box and the exhaust stack of the gas turbine engine. The space between the heat exchangers comprises a bypass duct for the exhaust gases and is openable and closeable by a butterfly valve. The longitudinal edges of the bypass duct are each provided with a flow divider device extending upstream of the exhaust gas flow by a distance at least equal to the width of the bypass duct. The flow divider devices are mirror images of each other and the forwardmost longitudinal edges thereof are blunt. The inner facing surfaces of the flow divider devices are configured to provide a two dimensional bellmouth entrance to the bypass duct, and the opposite surfaces of the flow divider devices are configured as controlled diffusion surfaces.

6 Claims, 4 Drawing Sheets

GAS-SIDE BYPASS FLOW SYSTEM FOR THE AIR RECUPERATOR OF A GAS TURBINE ENGINE

The subject invention was made under Government Contract N00024-88-C-4147.

TECHNICAL FIELD

The invention relates to a gas-side bypass flow system for the air recuperator of a gas turbine engine, and more particularly to such a system wherein the effective bypass flow area is greatly increased without increasing the dimensions of the air recuperator.

BACKGROUND ART

Under some circumstances it would be advantageous to take the pressurized air from the compressor section of a gas turbine engine and cause this pressurized air to pass in heat exchange with the hot exhaust gases of the engine, before the pressurized air from the compressor section is introduced into the combustor. The heat exchanger, generally referred to as a recuperator, could have a bypass system so that the engine exhaust gasses can, in part at least, bypass the heat exchanger, when desired. One known recuperator with a gas-side bypass is that designed by Solar Turbines Inc. for the M-1 battle tank engine. Recuperated gas turbine engines would be useful, for example, on board a ship. The recuperator would normally be located at the juncture of the gas turbine engine exhaust gas box and the exhaust stack. Such a recuperator would typically comprise a pair of heat exchangers in parallel spaced relationship, the space therebetween defining a bypass duct which is closable by a butterfly valve.

Recuperated engines should achieve excellent low power specific fuel consumption. A major problem arises, however, with respect to the ability to generate high power output during emergency operations or high ship speeds. A major reason for this is the gas-side total pressure losses of the hot exhaust gas stream are high through the exhaust system recuperator. The problem is magnified by the fact that, for installation purposes, the size of the recuperator is desired to be as small as possible. A related problem results from the fact that, with the desire for a smaller recuperator, less space would be available for a bypass system. As a result of all this, under high-flow, high-power conditions, high exhaust total pressure losses would be experienced.

The present invention is based upon the discovery that if the longitudinal edges of the bypass duct are provided with the flow divider devices of the present invention, as described hereinafter, the effective area of a rectangular bypass duct may be increased as much as from about thirty percent (30%) to forty percent (40%). This allows nearly a one-hundred percent (100%) bypass of the recuperator heat exchangers. The maximum shaft horsepower capability is increased by about twelve percent (12%). The invention enables a minimum sized duct between the recuperator heat exchangers because the rectangular duct flow coefficient is improved from about 0.60–0.70 to about 0.99. This, in turn, saves weight, space and cost.

DISCLOSURE OF THE INVENTION

According to the invention there is provided a bypass flow system for a gas-side air recuperator of a gas turbine engine. The recuperator comprises a pair of heat exchangers arranged in parallel spaced relationship with respect to each other and located in the hot exhaust gas stream between the exhaust gas box and the exhaust stack of the gas turbine engine.

The rectangular space defined between the heat exchangers constitutes a bypass duct for the exhaust gases and is openable and closeable by a butterfly valve. The longitudinal edges of the bypass duct are each provided with a flow divider device. Each flow divider device extends upstream of the heat exchangers by a distance at least equivalent to the width of the bypass duct.

The flow divider devices are substantially identical mirror image devices, the forwardmost longitudinal edges of which are blunt and rounded. The facing side surfaces of the flow divider devices are configured to provide a bell mouth entrance to the bypass duct, and the opposite side surfaces of the flow divider devices are configured as controlled diffusion surfaces for entering the heat exchangers. As a consequence of this construction, substantially 100% of the cross-sectional area of the bypass duct becomes effective and can be used for bypass purposes, so that the duct can be a minimum size to accommodate substantially 100% of the exhaust gases (when the recuperator is in the bypass mode), depending upon the size and nature of the recuperator heat exchangers.

DETAILED DESCRIPTION OF THE INVENTION

Figure 1:
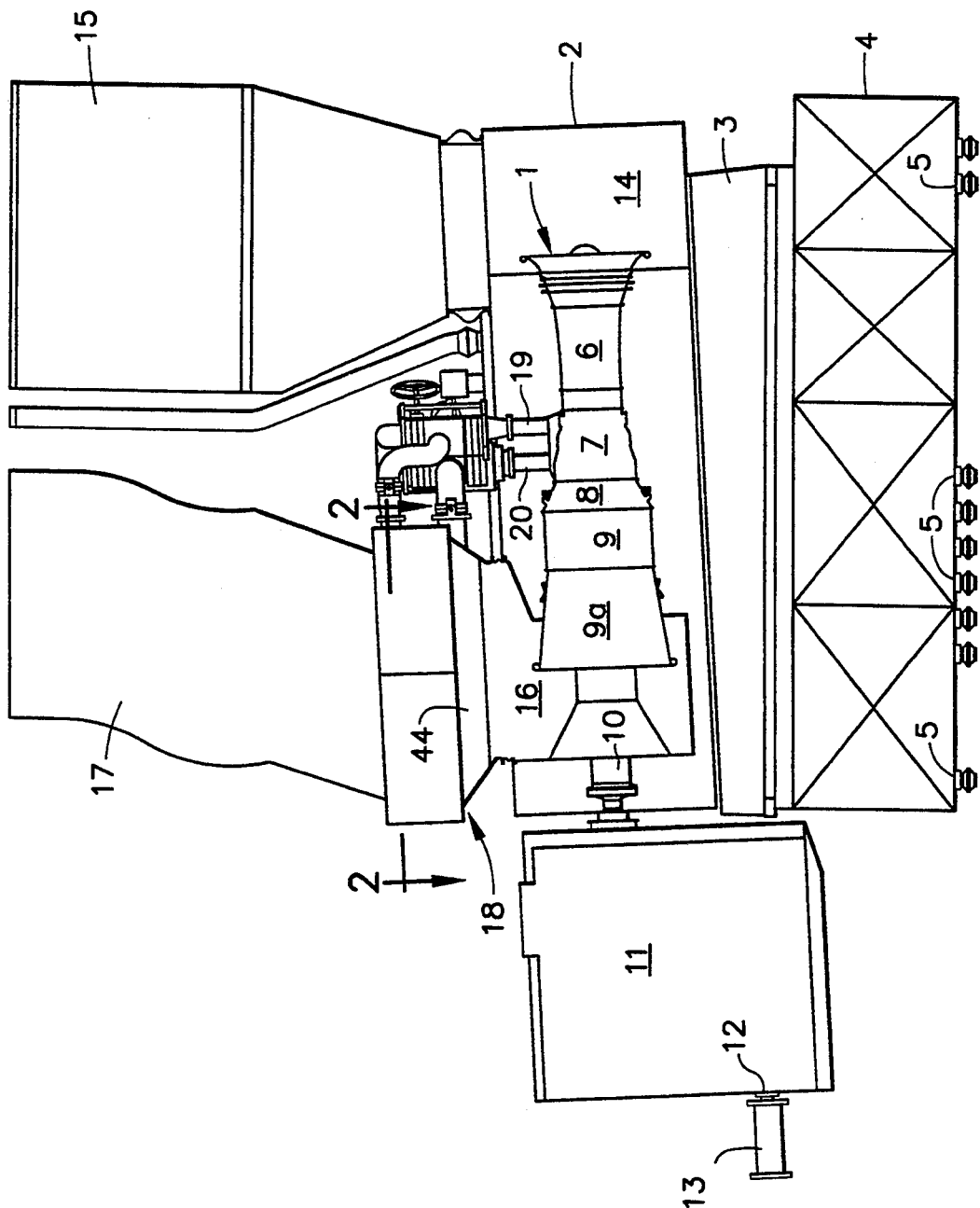
FIG. 1 is a simplified semi-diagrammatic representation of a shipboard gas turbine engine provided with a recuperator in accordance with the present invention.

FIG. 1 illustrates a shipboard installation of a gas turbine engine provided with a recuperator. The gas turbine engine is generally indicated at 1 and is enclosed in an engine module 2. The engine is supported on foundation elements 3 and 4. The foundation elements 3 and 4, themselves, are supported by the ship, via shock absorbing devices, some of which are shown at 5.

As is well known in the art, the engine 1 comprises a compressor section 6, an exchange section 7, a combustor section 8, a high pressure turbine section 9, and a free wheeling power turbine 9a.

The engine output shaft 10 is operatively connected to a reduction gear box 11, having an output shaft 12 with a coupling 13, connecting the output shaft 12 to the ship propeller shaft (not shown). The inlet end of engine 1 is located in a forward section of the engine module comprising an inlet air box 14. The inlet air box 14, in turn, is connected to the inlet stack 15 of the ship. In a somewhat similar fashion, the exhaust end of the gas turbine engine 1 is located in an exhaust gas box portion 16 of the engine module 2. The exhaust gas box portion 16, in turn, is connected to the exhaust stack 17 of the ship. A recuperator is generally indicated at 18. The recuperator is located at the junction between the exhaust gas box 16 and the exhaust stack 17. As a consequence, the hot exhaust gases from the discharge end of the gas turbine engine 1 pass upwardly through the exhaust gas box, and the recuperator 18 to the stack 17.

At the exchange section 7 of the gas turbine engine 1, compressor discharge air from the compressor 6 is conducted via conduit 19 to the recuperator 18 wherein the compressor discharge air is placed in heat exchange with the hot exhaust gases of the gas turbine engine 1. The heated compressor discharge air is returned to the engine via conduit 20, whereupon it enters the combustor section 8. At low power operation of the gas turbine engine 1, preheating the compressor discharge air prior to its entrance into the combustor section improves the specific fuel consumption. An example of a gas turbine engine 1 to which the present invention may be applied is the gas turbine manufactured by General Electric Company of Evendale, Ohio, under the designation LM2500. An intercooled regenerated engine system may also be used.

Figure 2:
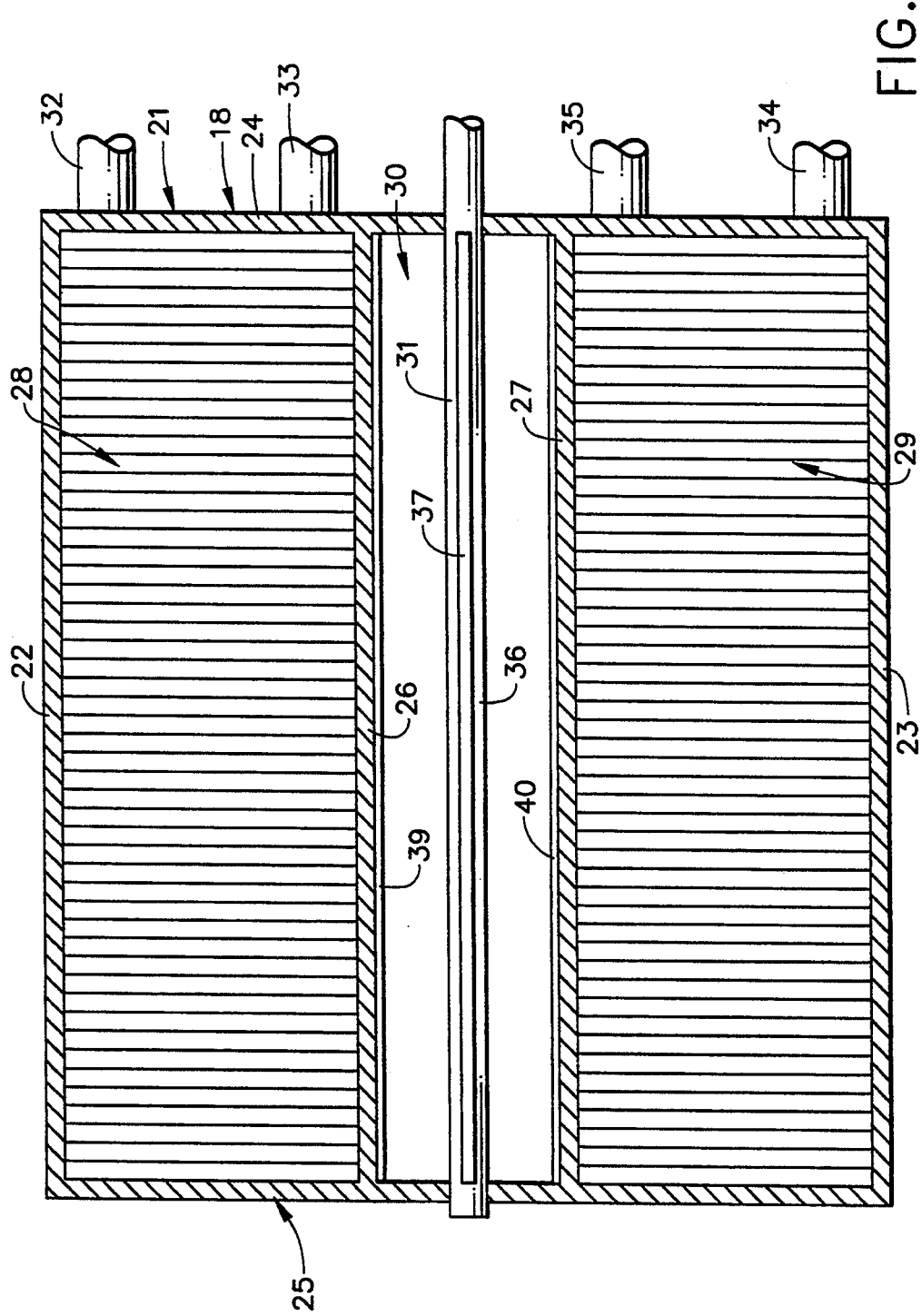
FIG. 2 is a simplified, cross-sectional view taken along section line 2—2 of FIG. 1.

Reference is now made to FIG. 2 wherein the recuperator 18 is shown in simplified, semi-diagrammatic form. In this simplified form, the recuperator is illustrated as having a frame generally indicated at 21 and comprising longitudinal sides 22 and 23, forward and rearward ends 24 and 25, and a pair of longitudinal internal walls 26 and 27, parallel to longitudinal side walls 22 and 23. Portions of front and rear end walls 24 and 25, together with longitudinal side wall 22 and longitudinal internal wall 26 define a first heat exchanger, generally indicated at 28. In similar fashion, longitudinal side wall 23, longitudinal internal wall 27 and portions of front and rear end walls 24 and 25 define a second heat exchanger, generally indicated at 29.

The space between first and second heat exchangers 28 and 29, defined by portions of front and rear end walls 24 and 25 and longitudinal internal walls 26 and 27 constitutes a bypass duct, generally indicated at 30. The bypass duct 30 is openable and closeable by a butterfly valve 31, which will be described in greater detail hereinafter.

The first heat exchanger 28 has an inlet 32 for compressor discharge air and an outlet 33 for the heated compressor discharge air, having been in heat exchange with the hot exhaust gases of gas turbine engine 1. Similarly, the second heat exchanger 29 will have an inlet 34, equivalent to inlet 32 and an outlet 35, equivalent to outlet 33.

Figure 3:
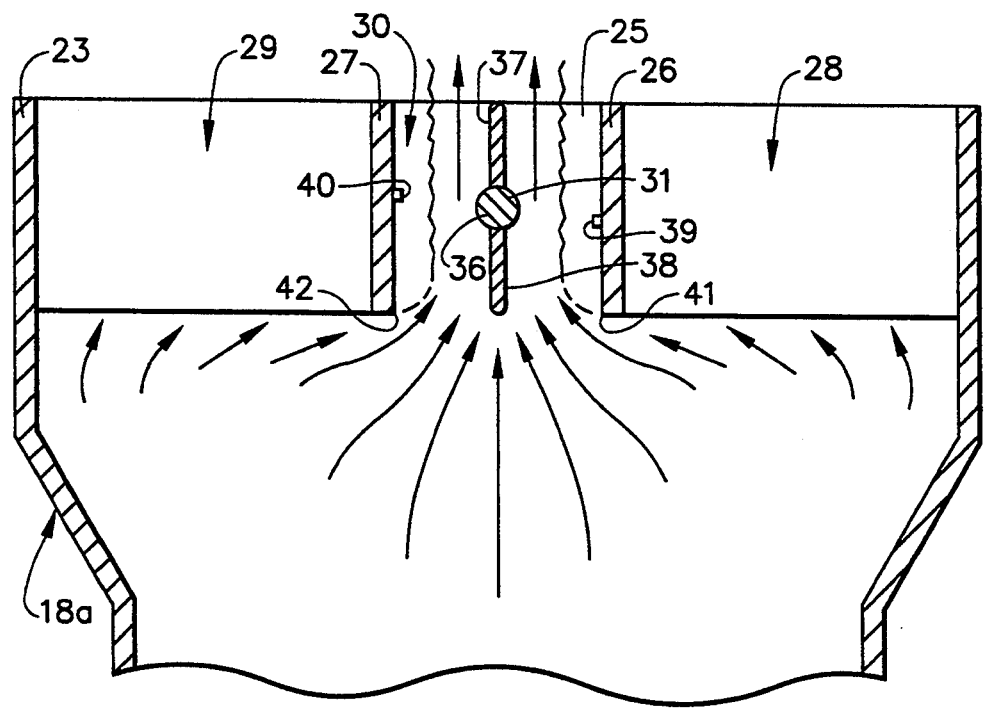
FIG. 3 is a simplified, transverse, cross-sectional view of a recuperator with gas-side bypass operation and without entry flow dividers.
Figure 4:
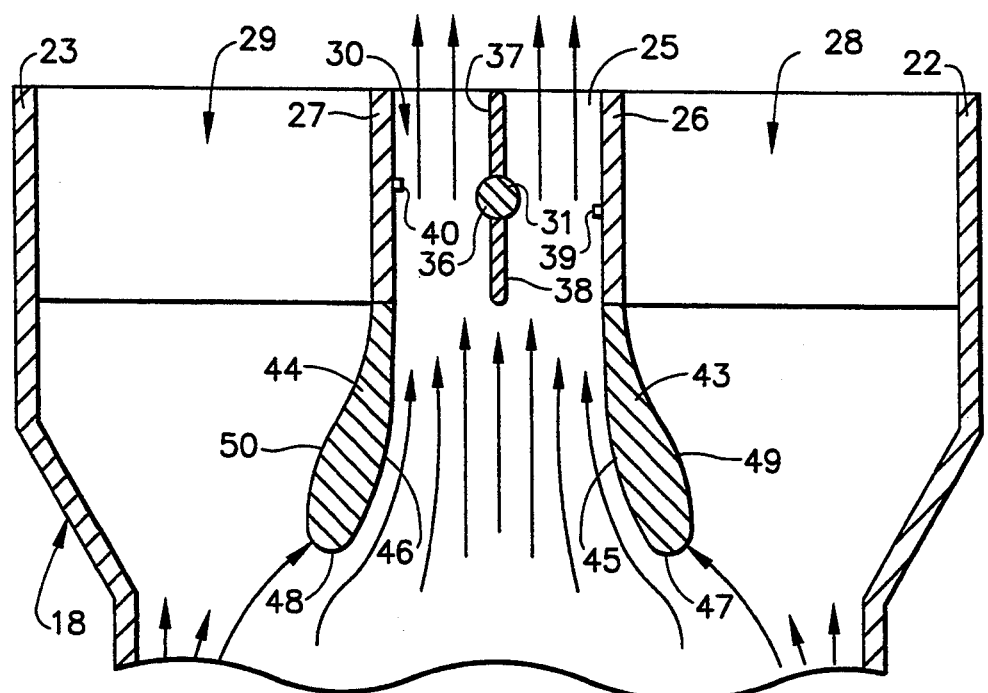
FIG. 4 is a simplified, transverse, cross-sectional view of a recuperator in accordance with the present invention, having entry flow dividers for the gas-side bypass, and illustrating the bypass butterfly valve in an open position.
Figure 5:
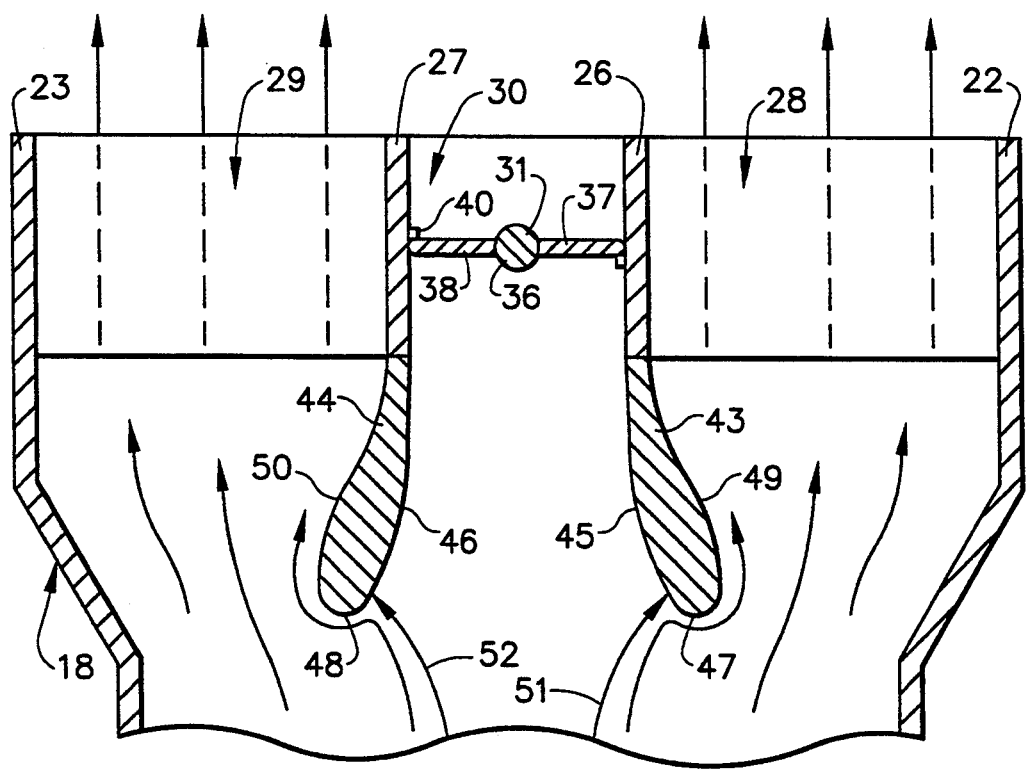
FIG. 5 is a simplified, transverse, cross-sectional view similar to FIG. 4, and illustrating the bypass butterfly valve in its closed position.

FIG. 3 is a simplified, semi-diagrammatic, transverse cross-sectional view of an exemplary regenerator generally indicated at 18a not provided with the flow divider devices of the present invention. FIGS. 4 and 5 are simplified, semi-diagrammatic, transverse cross-sectional views of the recuperator 18 of the present invention, having the flow divider devices of the present invention. It will be understood by one skilled in the art that FIG. 2 constitutes a cross-sectional plan view of the heat exchanger 18 of FIGS. 4 and 5. It may also serve as a cross-sectional plan view of the heat exchanger 18a of FIG. 3, since the upper portions of the heat exchanger 18a and the heat exchanger 18 of the present invention are substantially identical, and like parts have been given like index numerals.

In FIGS. 2, 3 and 4, the butterfly valve 31 is illustrated in its open position. The butterfly valve 31 comprises an elongated rotatable shaft 36 carrying diametrically opposed planar vanes 37 and 38. It will further be noted that the internal walls 26 and 27 have seals 39 and 40 affixed thereto. The seals 39 and 40 extend laterally from, and longitudinally along, their respective internal walls 26 and 27.

It will be apparent that if the butterfly valve shaft 36, as viewed in FIGS. 3 or 4, is rotated in a clockwise direction, the butterfly valve vane 37 will abut seal 39 and the butterfly valve vane 38 will abut seal 40, closing bypass duct 30 and preventing any leakage of hot exhaust gases around heat exchangers 28 and 29.

As indicated above, with the butterfly valve 31 of the recuperator 18a of FIG. 3 in its closed position (i.e., the position shown in FIG. 5), preheating the compressor discharge air in the recuperator will provide excellent specific fuel consumption, with the gas turbine engine 1 running at low power. A problem occurs, however, when circumstances require the generation of high power output during emergency operations or high ship speeds. The high power output is not achieved as desired. A primary reason for this is the gas-side total pressure losses of the hot exhaust gas stream through the exhaust system recuperator. This is true, even though the bypass valve 31 is open, as shown in FIG. 3. It has been shown, for example, that an engine such as the above mentioned LM2500 engine, if provided with a recuperator of the type shown at 18a in FIG. 3, can experience high exhaust total pressure losses of as much as 16% under high flow, high power conditions. By virtue of space constraints, the size of the recuperator is desired to be as small as possible. This, in turn, restricts the size of the bypass system. As a consequence, simply making the bypass system larger is not a viable solution to the problem.

It has been found that the bypass duct 30 is very inefficient. The bypass duct 30 presents a sharp edged orifice, the sharp edges being indicated in FIG. 3 at 41 and 42. This can result in a sharp edged orifice flow co-efficient of from about 0.60 to 0.70.

In an exemplary embodiment, the heat exchangers 28 and 29 are about 130 inches long and 45 inches wide. Each heat exchanger provides an entry flow area of 130×45, or 5,850 square inches. Taken together, the heat exchangers provide a total entry flow area of 2×5,850, or 11,700 square inches. The bypass duct 30 has a length of about 130 inches and a width of about 18 inches, providing a bypass physical flow area of 130×18, or 2,340 square inches.

The sharp edged orifice 41–42, having a flow coefficient of from about 0.60 to about 0.70, would give the bypass duct 30 an effective physical flow area of from about 0.60×2,340, or 1,404 square inches, to about 0.70×2,340, or 1,638 square inches.

The present invention is based upon the discovery that if a pair of flow divider devices is provided to convert the sharp edge orifice 41–42 of the entrance end of the bypass duct 30 to a bellmouth inlet shape, the orifice flow coefficient can be improved from about 0.60–0.70 up to about 0.99. The flow divider devices are illustrated in FIGS. 4 and 5 at 43 and 44. The flow divider devices comprise extensions which, as viewed in FIGS. 4 and 5, extend downwardly or upstream of the gas flow, from those edges of internal walls 26 and 27 which face the gas flow. The flow divider devices 43 and 44 extend the entire length of internal walls 26 and 27 and extend upstream of the gas flow by a distance at least equivalent to the width of the bypass duct 30. In the exemplary embodiment described above, the flow divider devices 43 and 44 would extend upstream of the gas flow by a distance of at least 18 inches (i.e., the width of the bypass flow duct 30). The facing inner surfaces 45 and 46 of flow divider devices 43 and 44 are so configured as to define a bellmouth inlet shape for bypass duct 30. The lowermost edges 47 and 48 of the flow divider devices 43 and 44 have a blunt or rounded configuration. The outer sides 49 and 50 of the flow divider devices 43 and 44 are configured, as shown, to have a controlled diffusion shape. This provides a low pressure loss for any flow entering the recuperator 18 during zero or partial gas-side bypass, or even maximum gas-side bypass. Furthermore, when the bypass valve is closed, the controlled diffusion surfaces 49 and 50 of the flow divider devices 45 and 46 provide an excellent recuperator heat exchanger entry flow field, assuring good distribution of the flow field into the core of each of the heat exchangers 28 and 29.

The provision of flow divider devices 43 and 44, and the bellmouth inlet shape provided thereby, increase the orifice flow coefficient of from about 0.60-0.70 up to about 0.99. This, in turn, improves the effective flow area of bypass duct 30 to about 0.99×2,340, or 2,317 square inches. It will be noted that this is very close to the actual cross-sectional area of the bypass duct 30, which is 2,340 square inches, constituting an effective flow area increase of about 32% to about 40%. In the exemplary embodiment described, this provides nearly a 100% bypass of the recuperator heat exchangers 28 and 29 and enables a 12% increase in maximum shaft horsepower.

When butterfly valve 31 is in its closed position (see FIG. 5) so that there is no bypass flow through bypass duct 30, a pair of stagnation lines or areas will develop as at 51 and 52. The area defined by stagnation lines 51 and 52, flow divider surfaces 45 and 46, and butterfly valve 31 will constitute a stagnation volume. Thus, no air flow will occur between stagnation lines 51 and 52. Outside stagnation lines 51 and 52, the flow will be directed to heat exchangers 28 and 29. The control diffusion shape of the outside surfaces 49 and 50 of flow divider devices 43 and 44 will assure little or no separation between the gas flow and the surfaces 49 and 50. As a result, the total pressure loss for the entry flow field, ahead of heat exchangers 28 and 29, will be minimized.

Since the teachings of the present invention maximize the effective flow area of bypass duct 30, the bypass duct 30 may be designed to be of a minimum size which will allow substantially 100% bypass for the size and characteristics of the recuperator 18 and its heat exchangers 28 and 29.

The following is a Table in which the performance of an LM2500 gas turbine engine is compared when provided with a recuperator without a bypass system (column A), and when provided with a recuperator having the bypass system of the present invention (column B).

TABLE

|  | A | B |
| --- | --- | --- |
| SHP | 26,886 | 30,125 (+12%) |
| Bypass Ratio | 0 | 0.9841 |
| Recuperator P/P | 0.8511 | 0.9823 |
| Bypass P/P | N/A | 0.9823 |
| Power Turbine Discharge Total Pressure | 19.131 psia | 16.763 psia |
| Recuperator Exhaust Mach No. | 0.0400 | 0.0005 |
| Bypass Exhaust Mach No. | N/A | 0.2155 |
| Recuperator Inlet Area | 11,700 in² | 11,700 in² |
| Bypass Entry Area | 0 | 2340 in² |

The recuperator and gas-side bypass system of column B were identical in construction and dimensions to the exemplary embodiment described above. It will be noted that when the gas turbine engine is run at full power, the shaft horsepower is increased by about 12%. The pressure ratio of the recuperator represents a loss of about 15% in column A and about 1.7% in column B. With respect to the power turbine discharge total pressure, it will be noted that it is higher in column A than in column B. Thus, without the gas-side bypass system of the present invention greater pressure is required, resulting in less power. Finally, the recuperator exhaust mach number is considerably higher in column A than in column B. It will be remembered that the higher the velocity, the greater the pressure losses.

Modifications may be made in the invention without departing from the spirit of it.

What is claimed is:

1. A gas-side bypass flow system for an air recuperator of a gas turbine engine, said gas turbine engine comprising a compressor section, a combustor section, and a turbine section followed by a free wheeling power turbine, said gas turbine engine having an exhaust gas emitting end, said recuperator being located in a path of said exhaust gas and comprising a pair of heat exchangers in parallel spaced relationship, a bypass duct being located between said heat exchangers and having longitudinal sides and ends, an inlet opening and an outlet opening for said bypass duct, means for opening and closing said bypass duct, and a flow divider associated with each of said bypass duct longitudinal sides for providing said inlet opening of said bypass duct with an orifice flow coefficient of about 0.99, wherein each of said flow dividers comprises an extension of its respective bypass duct longitudinal wall upstream of the flow of said exhaust gas by a distance at least equivalent to the width of said bypass duct.

2. The system claimed in claim 1 including an exhaust box surrounding said exhaust emitting end of said engine, an exhaust stack, said exhaust box having an opening operatively connected to said exhaust stack, said recuperator being located at the juncture of said exhaust box and said exhaust stack.

3. The system claimed in claim 1 wherein said flow divider means have inner facing surfaces configured to provide said bypass duct with a two dimensional bell mouth inlet, and terminate in blunt longitudinal edges facing upstream of said exhaust gases.

4. The system claimed in claim 1 wherein said flow divider means have outer surfaces configured to have a controlled diffusion shape for improved flow field into said heat exchangers when said bypass duct is closed and low pressure loss for exhaust gases entering the recuperator when said bypass duct is both open and closed.

5. The system claimed in claim 1 wherein said means for opening and closing said bypass duct comprises a butterfly valve, said butterfly valve comprising an elongated rotatable shaft extending centrally and longitudinally of said bypass duct, planar, diametrically opposed, longitudinally extending vanes being affixed to said shaft, a seal extending laterally from and longitudinally of each of said bypass duct longitudinal sides, said butterfly valve being rotatable between an open position wherein said vanes are substantially parallel to said bypass duct longitudinal sides, and a closed position wherein said vanes are substantially perpendicular to said bypass duct longitudinal sides and are in abutment with said seals.

6. The system claimed in claim 1 wherein the effective flow area of said bypass duct is substantially equivalent to its cross-sectional area, whereby to enable minimization of the size of bypass duct while providing substantially 100% bypass of said recuperator heat exchangers.

* * * * *